United States Patent
Bachant et al.

(10) Patent No.: US 12,073,359 B2
(45) Date of Patent: Aug. 27, 2024

(54) REAL-TIME BILL OF MATERIALS FOR A VEHICLE

(71) Applicant: GM Cruise Holdings LLC, San Francisco, CA (US)

(72) Inventors: Thomas Bachant, San Francisco, CA (US); Nadav Ullman, San Francisco, CA (US); Joseph Thibeault, San Francisco, CA (US); Jake McCloskey, San Francisco, CA (US); Jose Arturo Covarrubias Reynoso, San Francisco, CA (US); Paul Garcia, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 468 days.

(21) Appl. No.: 16/723,670

(22) Filed: Dec. 20, 2019

(65) Prior Publication Data

US 2021/0192450 A1   Jun. 24, 2021

(51) Int. Cl.
| | |
|---|---|
| G06Q 10/0875 | (2023.01) |
| G06Q 10/20 | (2023.01) |
| G07C 5/00 | (2006.01) |
| G07C 5/08 | (2006.01) |
| G06T 19/00 | (2011.01) |

(52) U.S. Cl.
CPC ......... *G06Q 10/0875* (2013.01); *G06Q 10/20* (2013.01); *G07C 5/008* (2013.01); *G07C 5/0808* (2013.01); *G06T 19/006* (2013.01)

(58) Field of Classification Search
CPC ................ G06Q 10/0875; G06Q 10/20
See application file for complete search history.

(56) References Cited

U.S. PATENT DOCUMENTS

| | | | | |
|---|---|---|---|---|
| 6,704,864 | B1 * | 3/2004 | Philyaw | H04L 41/082 713/1 |
| 7,855,663 | B2 * | 12/2010 | Wilbrink | G07C 5/085 340/568.1 |
| 2002/0044049 | A1 * | 4/2002 | Saito | G07C 5/008 340/425.5 |
| 2004/0263334 | A1 * | 12/2004 | Hasegawa | G08B 21/24 340/572.1 |
| 2008/0005733 | A1 * | 1/2008 | Ramachandran | G06F 8/65 717/168 |
| 2010/0315204 | A1 * | 12/2010 | Kamel | B61K 9/04 340/10.51 |
| 2014/0337086 | A1 * | 11/2014 | Asenjo | G06F 3/0635 705/7.28 |

(Continued)

OTHER PUBLICATIONS

"Arena Solutions and SiliconExpert Partner to Reduce Supply Chain Risk", 2014, https://www.sdcexec.com/warehousing/news/11617329/ arena-plm-customers-can-now-perform-proactive-health-and-risk-assessments-on-all-components-within-the-bill-of-materials (Year: 2014).*

*Primary Examiner* — Allen C Chein

(57) ABSTRACT

Systems and methods are provided for an automatically updated, self-reporting bill of materials. System components report important identifying information including firmware versions, software versions, and part numbers. In particular, when the system detects a change in a component, the bill of materials is updated. Additionally, a log of changes is saved.

15 Claims, 7 Drawing Sheets

(56) References Cited

U.S. PATENT DOCUMENTS

| | | | |
|---|---|---|---|
| 2016/0112216 A1* | 4/2016 | Sargent | H04L 12/66 |
| | | | 370/328 |
| 2016/0328883 A1* | 11/2016 | Parfenov | G06T 19/006 |
| 2017/0023945 A1* | 1/2017 | Cavalcanti | G08G 1/04 |
| 2017/0242678 A1* | 8/2017 | Sangameswaran | G06F 8/65 |
| 2019/0066398 A1* | 2/2019 | Sankavaram | G07C 5/006 |
| 2019/0236271 A1* | 8/2019 | Shivanna | G06F 21/575 |

* cited by examiner

| | 304a | 304b | 304c | 304d | 304e |
|---|---|---|---|---|---|
| | Name Space | Part No | Serial No. | FNA Descr. | Firmware version |
| 302a | Camera_back_left | 8461234 | V9A37465798 | CAMERA, SV LONG RANGE | |
| 302b | Camera_back_right | 8461234 | VK929745392 | CAMERA, SV LONG RANGE | |
| 302c | Camera_front_left | 8461235 | V3A123390857 | CAMERA, RR VIEW LONG RANGE | |
| 302d | Camera_front_right | 8461235 | V9681293875 | CAMERA, RR VIEW LONG RANGE | |
| 302e | Lidar_side_left | 8462394 | P8J0923478810 | | application:[3.0.62.1"] |
| 302f | Lidar_side_right | 8462394 | P9H23498739 | | application:[3.0.62.1"] |

| Name Space | Part No | Firmware version | Extrinsic calibration values | | |
|---|---|---|---|---|---|
| Radar_rear1 | 84671356 | Firmware_key_1: ['0.1.11', '0.0.1'] | X:3.03211 | Y:-0.9512 | Z:0.5 |
| | No target set | No target set | No target set | No target set | No target set |
| Radar_rear2 | 84671356 | Firmware_key_1: ['0.2.12', '0.3.1'] (conflict) | X:7.01232 (conflict) | Y:-0.9512 | Z:2.1219 (conflict) |
| | 84671356 (match) | Firmware_key_1: ['0.1.11', '0.0.1'] | X:0-5 | Y:-2-0 | Z:0-1 |
| Lidar_roof_left | 84670932 | Firmware_key_1: ['0.1.11', '0.0.1'] | X:3.03211 | Y:-0.9512 | Z:0.5 |
| | 84670932 (match) | Firmware_key_1: ['0.1.11', '0.0.1'] | X:0-5 | Y:-2-0 | Z:0-1 |

FIG. 6

REAL-TIME BILL OF MATERIALS FOR A VEHICLE

FIELD OF THE DISCLOSURE

The present disclosure relates generally to autonomous vehicles (AVs) and to systems and methods for updating vehicle information.

BACKGROUND

Autonomous vehicles, also known as self-driving cars, driverless vehicles, and robotic vehicles, are vehicles that use multiple sensors to sense the environment and move without human input. Automation technology in the autonomous vehicles enables the vehicles to drive on roadways and to accurately and quickly perceive the vehicle's environment, including obstacles, signs, and traffic lights. The vehicles can be used to pick up passengers and drive the passengers to selected destinations. When vehicles are produced, a bill of materials is generated that lists the components included in the vehicle, including part numbers and identifying information. The bill of materials is used to track parts and is consulted, for example, when a part is recalled. Whenever a component or part is replaced, a technician manually updates the bill of materials to reflect the new part.

SUMMARY

Systems and methods are provided for automatically updating the bill of materials for a vehicle. In manufacturing, a bill of materials (BOM) is the representation of the parts in a system. The BOM enables the components of any given system to be tracked, which can be useful operationally and legally (e.g., a recall). Generally, tracking the components in the BOM is done manually using a spreadsheet or another database source, which store a static list of materials, quantities, and other data about each piece in the system. When changes are made to the system, the BOM is manually updated to keep an up-to-date listing of system components. If a BOM is not kept up-to-date, it may not be possible to meet legal reporting requirements. Additionally, if the BOM is not kept up-to-date, it may not be possible to properly diagnose problems with the system and perform future repairs. However, manual data entry is subject to human error. Furthermore, even if a component or part has a bar code or QR code that can be scanned when the component is selected to be installed in a system, there is no guarantee that the part was in fact installed. Furthermore, a technician may forget to scan a part, and then the part will not be entered or updated in the bill of materials.

Thus, systems and methods are provided for an automatically updated, self-reporting bill of materials. System components report important identifying information including firmware versions, software versions, and part numbers. The identifying information can be used for diagnostics in case of any problems with the system. In particular, the system detects a change in a component for any of the values, and the bill of materials is updated. Additionally, a log of changes is saved.

According to one aspect, a method for automatically updating a bill of materials includes running an automatic component detection process, outputting an updated component configuration, determining whether the updated component configuration is acceptable, and saving the updated component configuration to a bill of materials. In some examples, the updated component configuration is saved when the updated component configuration is acceptable.

In some implementations, the method includes creating a log of changes to the bill of materials. In some examples, the log of changes is used for diagnostics when there is a problem with the vehicle. In some implementations, the method includes receiving self-reported component data. In some examples, outputting the updated component configuration includes outputting the self-reported component data. In some examples, the self-reported component data includes at least one of a part number, a serial number, a firmware version, and a software version.

In some implementations, when the updated component configuration is not acceptable, the updated component configuration is flagged for review. In some examples, the bill of materials is in an autonomous vehicle, and the method further includes scheduling the autonomous vehicle for service, and routing the autonomous vehicle to a service center.

In some implementations, the bill of materials is a bill of materials for a vehicle, and running an automatic component detection process comprises running the automatic component detection process when the vehicle is in service. In some implementations, determining whether the updated component configuration is acceptable includes comparing the updated component configuration to a target configuration. In some examples, comparing the updated component configuration to a target configuration includes comparing the updated component configuration to a range of target values.

In some implementations, the bill of materials is in an autonomous vehicle, and the method includes presenting data about components in the bill of materials to augmented reality glasses. In some implementations, the method includes presenting data from the bill of materials about selected components when the glasses are directed at the selected components.

In some implementations, the method includes reporting the updated component configuration in the bill of materials in a human-readable format, wherein reporting complies with selected compliance goals.

According to another aspect, a vehicle having an automatically updated bill of materials includes a plurality of components, wherein the components are configured to self-report selected component data, a processor for determining whether the self-reported component data meet predetermined criteria and identifying unacceptable component data, and a database for storing data for each of the plurality of components, and configured to update stored data based on self-reported component data.

In some implementations, the vehicle is an autonomous vehicle, and when unacceptable component data is identified, the vehicle is scheduled for service and the vehicle is routed to a service center for the scheduled service. In some implementations, the vehicle includes a second database for storing changes between an original bill of materials and updated stored data for each of the plurality of components. In some implementations, the vehicle includes an augmented reality system data about the plurality of components is presented to augmented reality glasses. In some examples, the augmented reality system is configured to display data about selected components when the glasses are directed at the selected components.

In another aspect, an autonomous vehicle having a self-updating bill of materials includes an onboard computer, an sensor suite comprising a plurality of sensors, and a plurality of components, wherein the sensors and the components are configured to self-report selected component data. The onboard computer in configured to receive updated component data, determine whether the updated component data is acceptable, and save the updated component data to the bill of materials. In some implementations, the onboard computer is further configured to store changes between an original bill of materials and the updated bill of materials. In some implementations, component data is used for diagnostics in case of any problems with the system.

In various implementations, a bill of materials includes a report of system components and metadata in a human-readable format. In some examples, the bill of materials is used as evidence of vehicle compliance with various regulations.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3 is a diagram illustrating a bill-of-materials, according to some embodiments of the disclosure;

FIG. 6 is a diagram illustrating bill-of-materials conflicts, according to some embodiments of the disclosure.

DETAILED DESCRIPTION

Figure 1:
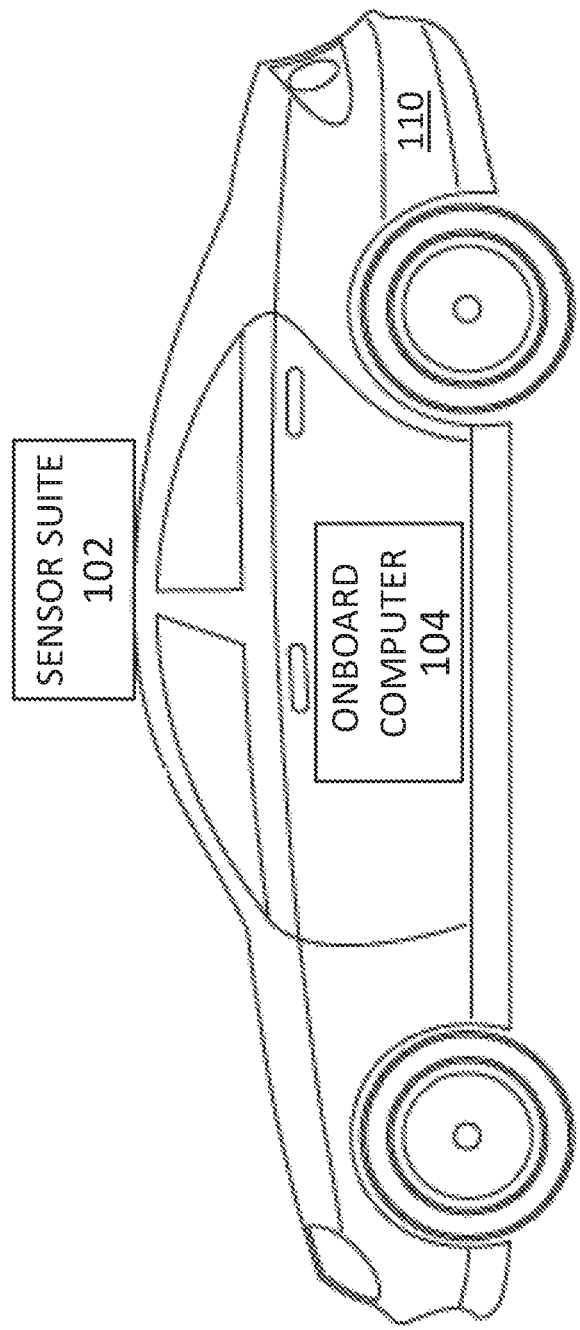
FIG. 1 is a diagram illustrating an autonomous vehicle, according to some embodiments of the disclosure.

Systems and methods are provided for automatically updating the bill of materials for a vehicle. In particular, systems and methods are provided for a real-time bill of materials that uses hardware sensors to automatically detect which parts are present on a vehicle and generate a continuously up-to-date component profile. The real-time bill of materials receives information from the components including part numbers, serial numbers, manufacturer information, and firmware versions.

Self-reporting hardware technology is used for diagnostic purposes, such that when a component is troubled. Self-reporting hardware technology has previously only been used as a read-only source for diagnostics. Systems and methods are provided for using the self-reporting feature of hardware components to record identifying information. Identifying information includes part numbers, serial numbers, manufacturer information, firmware versions, extrinsic calibration values, and other information. Keeping an up-to-date record of identifying information enables for easy compliance with regulations and other legal issues.

A bill of materials is a common way to track a list of parts in a system, and in particular, on a vehicle. Vehicles are shipped from a manufacturer with a bill of materials associated with it. The bill of materials included from the manufacturer contains the parts in the system. However, as cars are updated and maintained, the parts are often changed out. In some examples, for autonomous vehicle technology, vehicles received from the vehicle manufacturer are often updated and changed by the autonomous vehicle company. All the changes to a vehicle, whether for maintenance, repair, improvement, or any other reason, need to be tracked in the bill of materials. Currently, the changes are tracked manually: humans enter the data into a maintenance and part tracking web tool.

However, systems and methods are provided herein to leverage sensor data to build, maintain, and update a vehicle's bill of materials based on the data received from the sensors themselves. For example, when a LIDAR is replaced, or its firmware version is updated, or it is removed from the vehicle altogether, the change is automatically detected, logged, and stored to the bill of materials. This vastly increases the reliability of the bill of materials, since the possibility of human error is virtually eliminated.

Using an automated process for updating the bill of materials also enables detection of irregularities in the system configuration. In particular, irregularities can be flagged, and if parts are missing or misconfigured, warnings can be provided to technicians. In some implementations, an ideal state of the vehicle is defined via a set of guidelines (an ideal state BOM), and alerts and work orders can be automatically created if parts are reporting invalid, unapproved, or out-of-date values to the bill of materials. In some examples, the ideal state BOM verification process acts as an additional safeguard to counteract issues potentially introduced through technical misconfigurations or bugs.

In various implementations, in addition to updating based on information provided by parts that automatically report data, the automatically updated bill of materials also works with parts that don't automatically report data. In some examples, the automated bill of materials process is configured to integrate with technician tooling to track manual changes to "dumb" parts such as screws or other hardware that are tracked by a human. These changes can be verified through the ideal state BOM verification process to ensure that human error does not introduce invalid values to the system.

According to various aspects, by automating updates to the vehicle's hardware, software, and firmware profiles, a consistently up-to-date bill of materials is provided that does not require human intervention to be maintained.

FIG. 1 is a diagram 100 illustrating an autonomous vehicle 110, according to some embodiments of the disclosure. The autonomous vehicle 110 includes a sensor suite 102, an onboard computer 104. In various implementations, the autonomous vehicle 110 uses sensor information from the sensor suite 102 to determine its location, to navigate traffic, and to sense and avoid various obstacles.

The sensor suite 102 includes localization and driving sensors. For example, the sensor suite may include one or more of photodetectors, cameras, RADAR, SONAR, LIDAR, GPS, inertial measurement units (IMUs), accelerometers, microphones, strain gauges, pressure monitors, barometers, thermometers, altimeters, wheel speed sensors, and a computer vision system.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view.

The autonomous vehicle 110 includes an onboard computer 104, which functions to control the autonomous vehicle 110. The onboard computer 104 processes sensed data from the sensor suite 102 and/or other sensors, such as the airborne particle sensor 106, in order to determine a state of the autonomous vehicle 110. Based upon the vehicle state and programmed instructions, the onboard computer 104 controls and/or modifies driving behavior of the autonomous vehicle 110.

According to some implementations, the onboard computer 104 includes a database and stores a bill of materials for the autonomous vehicle 110. The bill of materials includes current information about the parts and components in the autonomous vehicle 110, including the parts and components of the sensor suite 102, as described in greater detail below. According to various examples, the bill of materials automatically updates based on data received from sensors and self-reporting components.

The onboard computer 104 functions to control the operations and functionality of the autonomous vehicles 110 and processes sensed data from the sensor suite 102 and/or other sensors in order to determine states of the autonomous vehicles no. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system 100 of FIG. 1 functions to enable an autonomous vehicle 110 to modify and/or set a driving behavior in response to parameters set by vehicle passengers (e.g., via a passenger interface) and/or other interested parties (e.g., via a vehicle coordinator or a remote expert interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Figure 2:
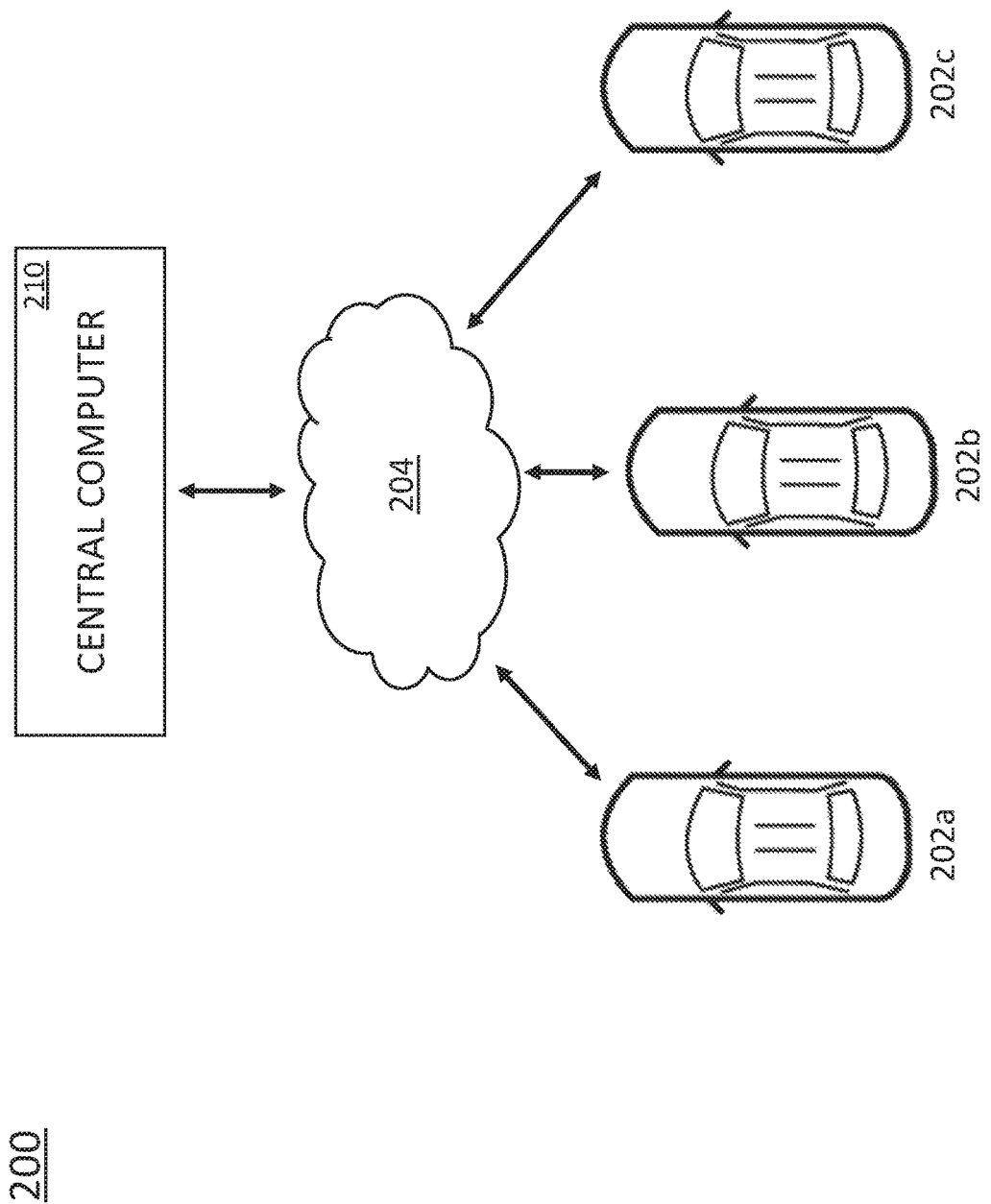
FIG. 2 is a diagram illustrating a fleet of vehicles in communication with a central computer, according to some embodiments of the disclosure.

FIG. 2 is a diagram 200 illustrating a fleet of vehicles 202a, 202b, 202c in communication with a central computer 210, according to some embodiments of the disclosure. As shown in FIG. 2, the vehicles 202a, 202b, 202c communicate wirelessly to a cloud 204 and a central computer 210. The central computer 210 includes a database of information from the vehicles in the fleet and a routing coordinator. In some examples, the database of information in the central computer 210 includes a real-time bill of materials for each vehicle 202a, 202b, 202c. Autonomous vehicle fleet routing refers to the routing of multiple vehicles in a fleet, and includes routing back to a service center for updates, repair, and maintenance.

According to various implementations, when vehicles return to a service center for updates, repair, and/or maintenance, the vehicle's bill of materials is automatically updated. In particular, each component and/or part of the vehicle transmits current data about itself to be added to the bill of materials. In some examples, the onboard computer includes a receiver that receives the transmitted component data and the onboard computer stores the received component data in the bill of materials. In some examples, each component and/or part of the vehicle transmits current data about itself to a remote compute system to be added to the bill of materials. In some implementations, the current data for a component or part is detected by a sensor or other component and recorded to the bill of materials. In some implementations, the bill of materials is updated after the vehicle is serviced. In some implementations, the bill of materials is also regularly updated while the vehicle is in use.

FIG. 3 is a diagram illustrating an exemplary portion of a bill of materials 300 for a vehicle, according to some embodiments of the disclosure. The bill of materials 300 includes a part or component of the vehicle in each row 302a-302f, and each column includes data about that part or component 304a-304e. The columns shown in the bill of materials 300 include name space 304a, part number 304b, serial number 304c, FNA description 304d, and firmware version 304e.

Vehicle components are listed in the rows, with one component in each row. The first column 304a is the "name space" column and contains a name for the component. In the first row 302a is a back left camera, named "camera_back_left" in this example, Similarly, the second row 302b contains details for a back right camera, the third row 302c contains details for a front left camera, the fourth row 302d contains details for a front right camera, the fifth row 302e contains details for a side left LIDAR, and the sixth row 302f contains details for a side right LIDAR. According to various implementations, the entire bill of materials for a vehicle includes hundreds of rows.

According to various implementations, each time one of the cameras or the LIDARS listed in the bill of materials 300 is turned on, the component (camera or LIDAR) self-reports its' current state including part number, serial number, firmware version, and other specific information. In some examples, each time the vehicle is turned on, the components self-report data. In general, most components included in vehicles are configured to self-report current data. In some examples, the components each sporadically and/or periodically self-report data. In some examples, the components send data to a cloud or web application. In some examples, the components send data to a local computer. In one example, components in the autonomous vehicle 110 and the sensor suite 102 self-report data to the onboard computer 104. In various examples, the local computer sends the updated component data to a cloud, central computer, and/or central database.

As shown in FIG. 3, the second column 304b includes the part number for each component, and the third column 304c includes the serial number for each part. According to various examples, multiple parts can have the same part number, and each part has a unique serial number. The fourth column 304d includes an FNA description for each part. This description may be used, for example, if a part is to be replaced.

The fifth column 304e shows the firmware version for each part. Some parts may not have firmware, such as the parts shown in rows 320a-302d. For parts that include firmware, the version of the firmware currently installed is listed in column 304e. Firmware is an example of component data that can change without changing the component itself. For example, firmware can be updated.

In various implementations, an entire bill of materials for a vehicle includes many more columns, and may include columns that apply to some components and not others. For example, an entire bill of materials may include about 10 columns, about 15 columns, about 20 columns, about 25 columns, or more than about 25 columns. A bill of materials can include sub-assemblies and sub-components to various parts present in a vehicle.

Figure 4:
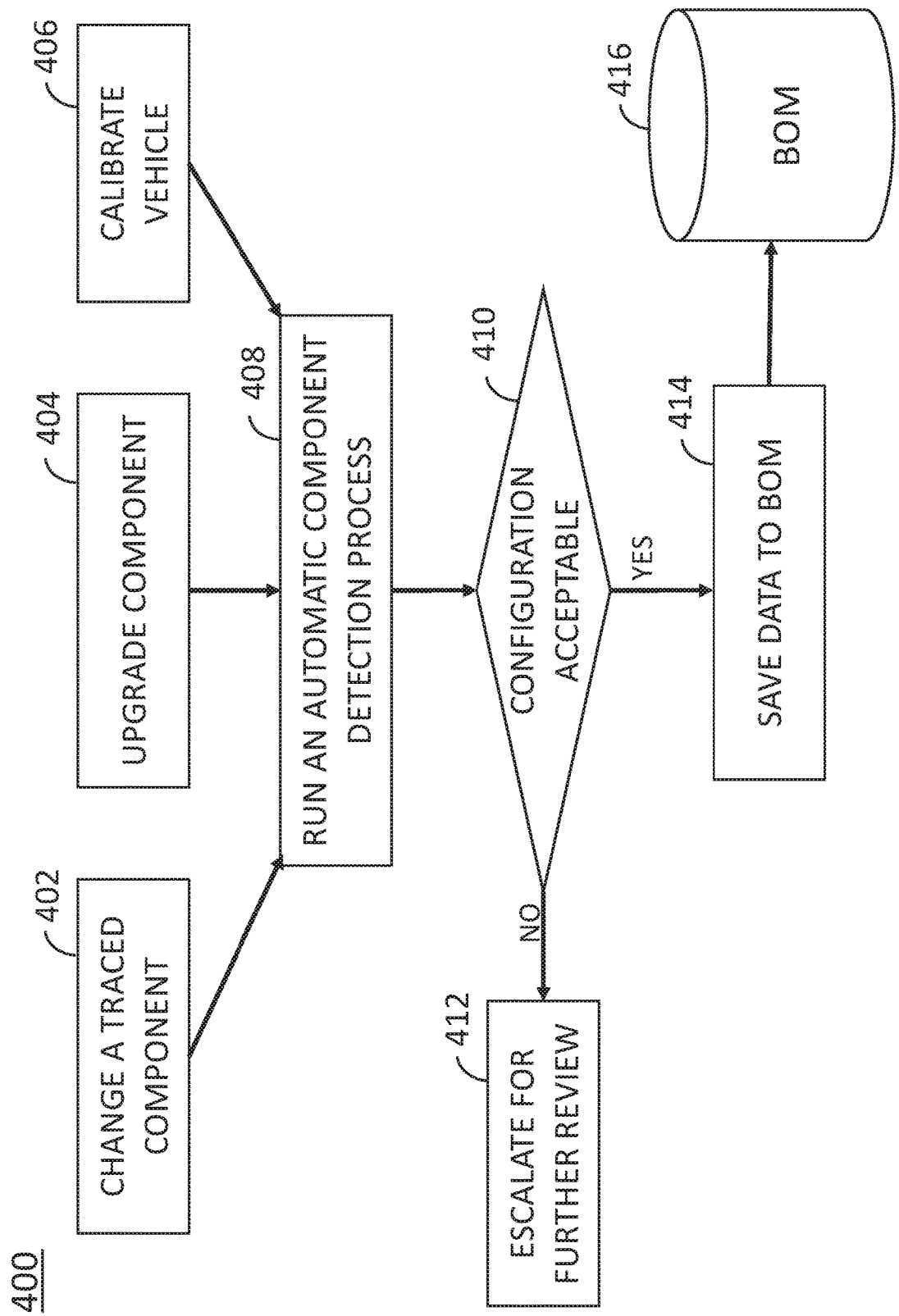
FIG. 4 is a flow chart illustrating a method of saving updates to a bill-of-materials for a vehicle, according to some embodiments of the disclosure.

FIG. 4 is a flow chart illustrating a method 400 of saving updates to a bill-of-materials for a vehicle, according to some embodiments of the disclosure. Updates to the bill of materials are made any time an automatic detection process detects a change to the bill of materials. There are many times an automatic component detection process is run. For example, if a traced component is changed (step 402), then an automatic component detection process is run (step 408). Similarly, if a component is upgraded (step 404), then an automatic component detection process is run (step 408). Additionally, any time the vehicle is calibrated (step 406), an automatic component detection process is run (step 408). In a further example, the automatic component detection process is run (step 408) any time a vehicle is turned on.

After the automatic component detection process is run at step 408, the method 400 proceeds to ensure that the configuration, including any updates or changes, is acceptable (step 410). In particular, in one example, any changes detected to the bill of materials are compared to a recorded acceptable configuration parameter. For example, the bill of materials can include a first row for each component with current component data and a second row for each component with acceptable values (acceptable configuration parameters) for the component. The acceptable values may include acceptable ranges, acceptable version numbers, or other acceptable values for the first (primary) row for each component. Changes to the bill of materials for a component are stored in the first row, and values stored in the first row are compared to the acceptable configurations parameters in the second row.

If the configuration is determined to be unacceptable at step 410, the configuration of the vehicle is escalated for further review at step 412. In particular, the vehicle and the updates to the vehicle are flagged for further review. The further review may include review by a technician. In some examples, further review can include further automated or computer review.

If the configuration is determined to be acceptable at step 410, the updated configuration is saved at step 414 to the bill of materials 416. According to various implementations, the bill of materials 416 is the updated, most recent bill of materials for the vehicle.

Figure 5:
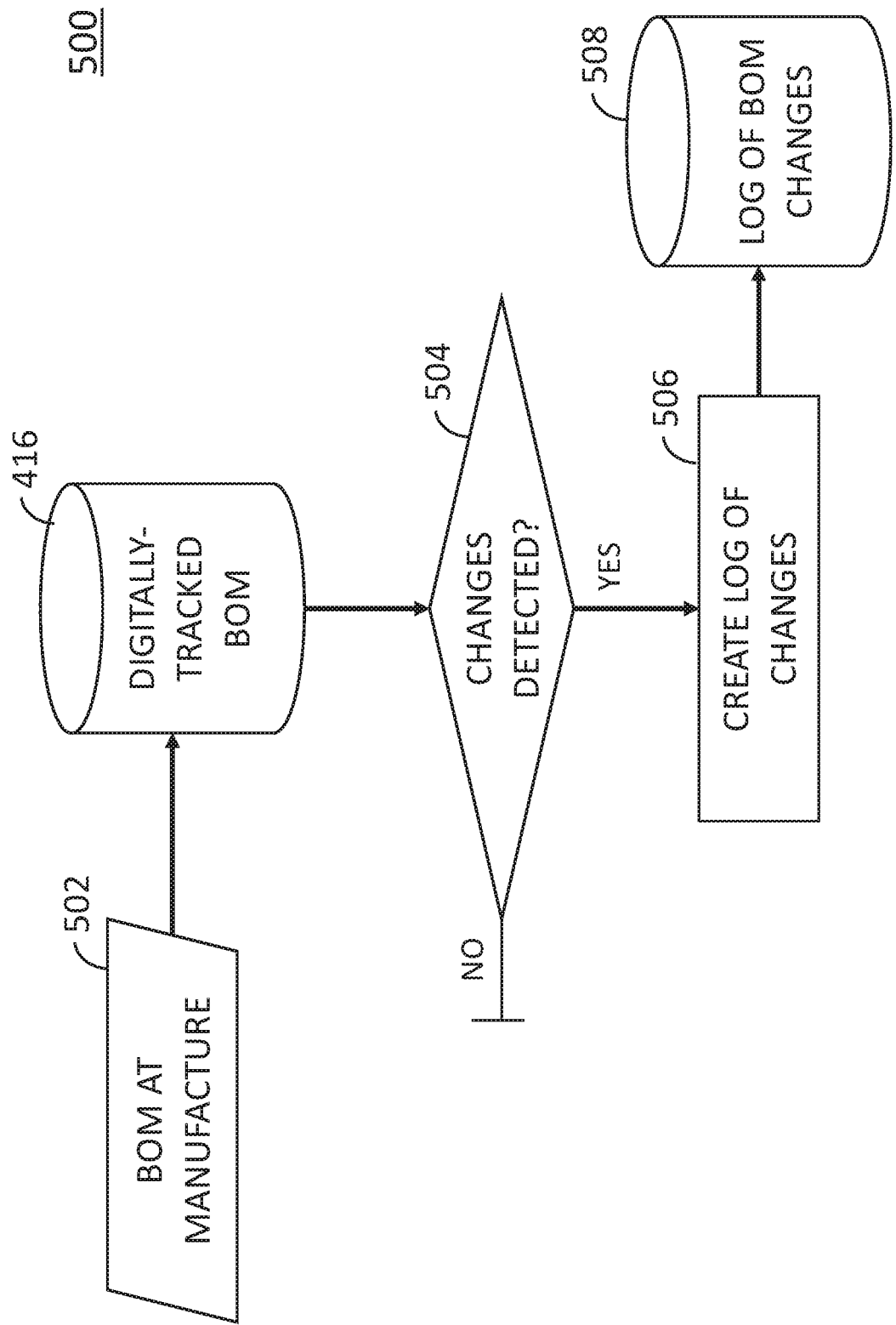
FIG. 5 is a flow chart illustrating a method of saving bill-of-materials changes for a vehicle, according to some embodiments of the disclosure.

FIG. 5 is a flow chart illustrating a method 500 of saving bill-of-materials changes for a vehicle, according to some embodiments of the disclosure. In particular, as shown in FIG. 5, a log of the changes to the bill of materials is saved. The updated bill of materials 416 from the method 400 is compared to the bill of materials at manufacture 502, and at step 504, it is determined whether any changes are detected between the original bill of materials 502 at manufacture and the updated bill of materials 416. If no changes are detected, the method ends. If changes are detected at step 504, a log of the changes is created at step 506 and the log of changes 508 is saved.

In some implementations, the method 500 compares the updated bill of materials 416 to a previously-saved bill of materials. Similarly, in some implementations, changes from the previously-saved bill of materials to the updated bill of materials 416 are added to a previously created log of changes 508.

FIG. 6 is a diagram 600 illustrating bill of materials conflicts, according to some embodiments of the disclosure. In particular, the diagram 600 shows a portion of a bill of materials including three components. The components are shown in rows 602a, 604a, and 606a. Row 602a includes data for a component named "radar_rear1", row 604a includes data for a component named "radar_rear2", and row 606a includes data for a component named "lidar_roof_left". According to various examples, the diagram 600 illustrates bill of materials changes and is an example of a bill of materials table that is submitted to step 410 in the method 400.

The bill of materials 600 includes a second row for each component that includes target values for the component. The targets may include acceptable ranges, acceptable version numbers, or other acceptable values for the first (primary) row for each component. For the first component in the table, rear_radar1 in row 602a, row 602b lists the target values. As shown in the table, however, no target is set for the rear_radar1 component in the second row 602b. For the second component, radar_rear2 in row 604a, the fourth row 604b includes a set of target values. Additionally, the third row 604a, which includes reported values for the radar_rear2 component, also includes an indication of whether the value reported (or detected) meets the target value or target range. As shown in the example in FIG. 6, several values for the second component are flagged as conflicting with the target values in row 604b. In particular, the firmware version in row 604a is flagged as conflicting with the target value in row 604b. Additionally, extrinsic calibration values for the x variable and for the z variable for the component of row 604a are flagged as conflicting.

According to various implementations, when the values in row 604a are flagged as conflicting with target values, the conflict is sent to a secondary source for resolution. In one implementation, the secondary source is a technician, and may be a human who investigates the conflict. In other implementations, the secondary source is an automated source that investigates the conflict.

The third component in the bill of materials 600 is a lidar_roof_left component in row 606a. The lidar_roof_left component has values as listed in row 606a. Row 606b includes the target values for the lidar_roof_left component. As shown in the bill of materials 600, the reported/detected values of the lidar_roof_left component in row 606a fall within acceptable values in the row 606b of target values.

Figure 7:
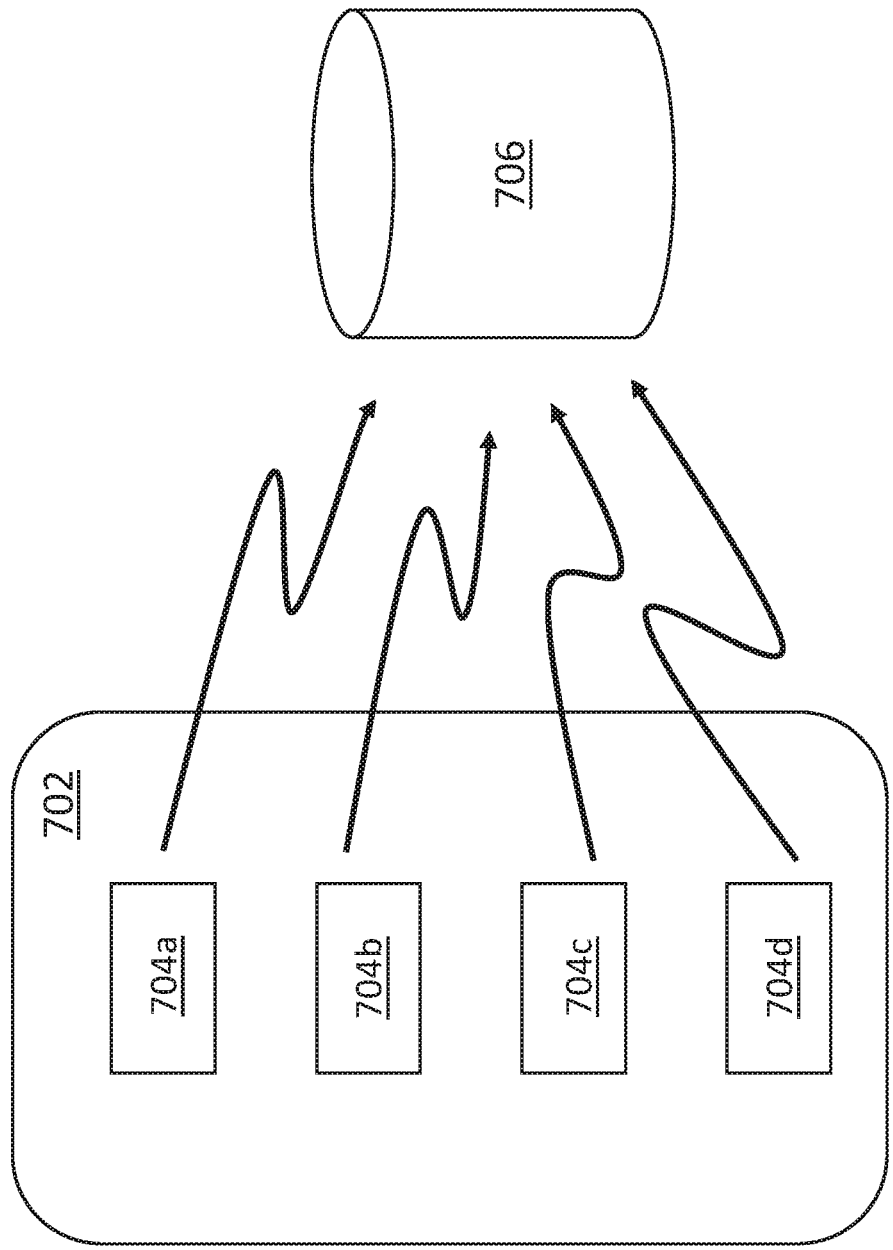
FIG. 7 is a diagram illustrating a self-reporting sensor system, according to some embodiments of the disclosure.

FIG. 7 is a diagram illustrating a self-reporting sensor system 700, according to some embodiments of the disclosure. The system 700 includes a product 702 that includes multiple components 704a, 704b, 704c, 704d. Each of the components 704a, 704b, 704c, 704d self-reports data about itself to a database 706. In some implementations, the components 704a, 704b, 704c, 704d self-report upon start-up or when restarted. In some implementations, the components 704a, 704b, 704c, 704d self-report periodically, for example daily, weekly, or hourly. In some implementations, data about the components 704a, 704b, 704c, 704d is detected by another source, sensor, or component at reported to the database 706.

According to various implementations, a log of the changes to the bill of materials is reviewed in the event of a safety issue. In particular, if any event leads to the possibility of a vehicle being unsafe or less safe than expected, the log of the changes to the bill of materials can be consulted to determine whether any changes were made to the vehicle that could be responsible for the safety issue. The log of the changes to the bill of materials is a history of changes made to the vehicle over the life of the vehicle.

In one example, firmware of various components in a vehicle self-updates and changes to the firmware versions are saved in the bill of materials. If a safety issue suddenly arises following a firmware update, the recent firmware update can be suspected and investigated as a potential cause of the safety issue. In some examples, if the safety issue arises in multiple vehicles following the same update, the bill of materials for each vehicle can be consulted to discover the corresponding updates and identify the updates that were performed by vehicles with the same safety issue.

In various implementations, the systems and method discussed herein can be used on any bill of materials, including any list of raw materials, sub-assemblies, intermediate assemblies, sub-components, parts, used to manufacture an end product. A bill of materials may include an engineering bill of materials, a sales bill of materials, a manufacturing bill of materials, and a service bill of materials. In some examples, the bill of materials represents the list of components used on a printed circuit board. The bill of materials may be a single-level bill of materials, an indented bill of materials, and/or a modular bill of materials. In some examples, the bill of materials is a configurable bill of materials. In some examples, the bill of materials is a multi-level bill of materials.

According to various embodiments, augmented reality programs are used in conjunction with the updated bill of materials to see which components are in a vehicle. For example, a hardware tab describes which components are in the vehicle, and augmented reality can be used by a user to select a vehicle, point to a specific location on/in the vehicle, and determine the components present in the selected location. Cameras in and on the vehicle can be used to provide a camera feed for use with the augmented reality system. Using 3-D coordinates, precise vehicle locations can be selected by a user.

According to various implementations, augmented reality is an interactive experience of a real-world environment, such as a selected vehicle, in which the objects that reside in the real world environment are enhanced by computer-generated perceptual information. The computer-generated perceptual information can include multiple sensory modalities, but for the purposes of accessing bill of materials information in a vehicle, the computer-generated perceptual information generally includes visual and auditory information. Auditory information is included for cases in which a user identifies an unusual or unexpected sound. In some examples, an olfactory input can be included, for cases in a vehicle has a strange smell.

In general, augmented reality is a combination of real and virtual worlds, includes an ability to interact with the presented simulation in real-time, and presents an accurate 3D registration of virtual and real objects. The sensory information is overlaid on a presentation of an actual real-world scenario (the vehicle), and the sensory information can be constructive (i.e., additive to the natural environment) or destructive (i.e., masking of the natural environment). The augmented reality experience is interwoven with the physical world such that it is perceived as an immersive aspect of the real environment. Thus, augmented reality alters a user's ongoing perception of a real-world environment—it does not replace it. Augmented reality is related mixed reality and computer-mediated reality.

In some examples, a user in an augmented reality interface selects the LIDAR sensors and the information about the LIDAR is presented to the user through the augmented reality interface. The LIDAR information includes the current firmware version, any previous updates, revisions, replacements, and/or maintenance.

In some examples, smart glasses are used to present the augmented reality interface to the user. Smart glasses superimpose information onto a field of view through an optical head-mounted display or using embedded wireless glasses with a transparent heads-up display overlay.

In some implementations, a bill of materials for an autonomous vehicle is updated while it is in operation when a self-reporting component reports an update, and the updated bill of materials is identified as unacceptable. In other implementations, a bill of materials is identified as unacceptable after a component on the bill of materials is recalled or otherwise identified as requiring replacement. When a bill of materials is identified as unacceptable, the autonomous vehicle is routed for maintenance.

As discussed above, each vehicle in a fleet of vehicles communicates with a routing coordinator. When a vehicle is flagged for service, the routing coordinator schedules the vehicle for service and routes the vehicle to the service center. When the vehicle is flagged for maintenance, a level of importance or immediacy of the service can be included. As such, service with a low level of immediacy will be scheduled at a convenient time for the vehicle and for the fleet of vehicles to minimize vehicle downtime and to minimize the number of vehicles removed from service at any given time. In some examples, the service is performed as part of a regularly-scheduled service. Service with a high level of immediacy may require removing vehicles from service despite an active need for the vehicles.

An unacceptable bill of materials configuration is an example of a routing goal. In particular, as described above, an unacceptable bill of materials reflects the presence of an unacceptable part which needs to be serviced. For example, the unacceptable part may need to be replaced or updated. Thus, the vehicle having the unacceptable part (as reflected in the unacceptable bill of materials) needs to be routed to an appropriate facility to resolve the issue, and this is a routing goal. In some examples, multiple vehicles in a fleet have the unacceptable part and thus have unacceptable bills of materials, and multiple vehicles in the fleet need to be routed to a facility for service to resolve the issue with the unacceptable bill of materials (e.g., by servicing an unacceptable part).

Routing goals may be specific or general in terms of both the vehicles they are applied to and over what timeframe they are applied. As an example of routing goal specificity in vehicles, a routing goal may apply only to a specific vehicle (in this case a vehicle with an unaccepted bill of materials), or to all vehicles of a specific type, etc. Routing goal timeframe may affect both when the goal is applied (e.g., urgency of the goal, or, some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

In various implementations, the routing coordinator is a remote server or a distributed computing system connected to the autonomous vehicles via an internet connection. In some implementations, the routing coordinator is any suitable computing system. In some examples, the routing coordinator is a collection of autonomous vehicle computers working as a distributed system.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Select Examples

Example 1 provides a method for automatically updating a bill of materials. The method includes running an automatic component detection process, outputting an updated component configuration, determining whether the updated component configuration is acceptable, and saving the updated component configuration to a bill of materials. In some examples, the updated component configuration is saved when the updated component configuration is acceptable.

Example 2 provides a method according to example 1, including creating a log of changes to the bill of materials.

Example 3 provides a method according to examples 1-2, including receiving self-reported component data.

Example 4 provides a method according to examples 1-3 where outputting the updated component configuration includes outputting the self-reported component data.

Example 5 provides a method according to any one of the preceding examples, where the self-reported component data includes at least one of a part number, a serial number, a firmware version, and a software version.

Example 6 provides a method according to any one of the preceding examples wherein when the updated component configuration is not acceptable, flagging the updated component configuration for review.

Example 7 provides a method according to any one of the preceding examples where the bill of materials is in an autonomous vehicle, and further comprising scheduling the autonomous vehicle for service, and routing the autonomous vehicle to a service center.

Example 8 provides a method according to any one of the preceding examples wherein the bill of materials is a bill of materials for an autonomous vehicle, and wherein running an automatic component detection process comprises running the automatic component detection process when the vehicle is in service.

Example 9 provides a method according to any one of the preceding examples where determining whether the updated component configuration is acceptable includes comparing the updated component configuration to a target configuration.

Example 10 provides a method according to any one of the preceding examples wherein comparing the updated component configuration to a target configuration includes comparing the updated component configuration to a range of target values.

Example 11 provides a method according to any one of the preceding examples where the bill of materials is in an autonomous vehicle, and further comprising presenting data about components in the bill of materials to augmented reality glasses.

Example 12 provides a method according to any one of the preceding examples including presenting data from the bill of materials about selected components when the glasses are directed at the selected components.

Example 13 provides a method according to any one of the preceding examples including reporting the updated component configuration in the bill of materials in a human-readable format, wherein reporting complies with selected compliance goals.

Example 14 provides a vehicle having an automatically updated bill of materials. The vehicle includes a plurality of components, wherein the components are configured to self-report selected component data. The vehicle includes a processor for determining whether the self-reported component data meet predetermined criteria and identifying unacceptable component data. The vehicle also includes a database for storing self-reported component data for each of the plurality of components. The database is configured to update previously-stored data based on the self-reported component data.

Example 15 provides a vehicle according to example 14, where the vehicle is an autonomous vehicle.

Example 16 provides a vehicle according to any one of examples 14 and 15, where when unacceptable component data is identified, the vehicle is scheduled for service and the vehicle is routed to a service center for the scheduled service.

Example 17 provides a vehicle according to any one of examples 14-16, including a second database for storing changes between an original bill of materials and updated stored data for each of the plurality of components.

Example 18 provides a vehicle according to any one of examples 14-17, including an augmented reality system.

Examples 19 provides a vehicle according to any one of examples 14-18, where data about the plurality of components is presented to augmented reality glasses.

Example 20 provides a vehicle according to any one of examples 14-19, wherein the augmented reality system is configured to display data about selected components when the glasses are directed at the selected components.

Example 21 provides an autonomous vehicle having a self-updating bill of materials. The autonomous vehicle includes an onboard computer. The autonomous vehicle includes a plurality of components including a plurality of sensors from a sensor suite, where each of the plurality of components is configured to self-report selected component data. The onboard computer is configured to receive updated component data, determine whether the updated component data is acceptable, and save the updated component data to an updated bill of materials.

Example 22 provides the autonomous vehicle of example 21, where the onboard computer is further configured to store changes between an original bill of materials and the updated bill of materials.

Variations and Implementations

According to various examples, driving behavior includes any information relating to how an autonomous vehicle drives. For example, driving behavior includes how and when the autonomous vehicle actuates its brakes and its accelerator, and how it steers. In particular, the autonomous vehicle is given a set of instructions (e.g., a route or plan), and the driving behavior determines how the set of instructions is implemented to drive the car to and from various destinations, and, potentially, to stop for passengers or items. Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, "legal ambiguity" conduct (e.g., in a solid-green left turn situation, whether a vehicle pulls out into the intersection or waits at the intersection line), action profiles (e.g., how a vehicle turns, changes lanes, or performs a driving maneuver), and action frequency constraints (e.g., how often a vehicle changes lanes).

As will be appreciated by one skilled in the art, aspects of the present disclosure, in particular aspects of a perception system for an autonomous vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A method for automatically updating a bill of materials for an autonomous vehicle, wherein the autonomous vehicle is a first autonomous vehicle in a fleet of vehicles, comprising:
calibrating a first component in the first autonomous vehicle to generate a first updated extrinsic calibration value for a first variable, a second updated extrinsic calibration value for a second variable, and a third updated extrinsic calibration value for a third variable, wherein the first component is one of a LIDAR component and a RADAR component;
determining that a calibration has occurred in the first autonomous vehicle;
running an automatic component detection process for detecting data about a plurality of components of the first autonomous vehicle, wherein the plurality of components includes the first component, and wherein the automatic component detection process is run in response to determining that the calibration has occurred;
receiving self-reported component data from the first component including receiving an update to component data wherein component data includes the first updated extrinsic calibration value, the second updated extrinsic calibration value, and the third updated extrinsic calibration value;
outputting an updated component configuration including updated component data for the plurality of components in the first autonomous vehicle, wherein the updated component data includes the self-reported component data from the first component;
saving the updated component configuration to the bill of materials;
comparing changes to the updated component configuration with recorded acceptable configuration parameters;
identifying a calibration conflict including determining that at least one of the first extrinsic calibration value, the second extrinsic calibration value, and the third extrinsic calibration value conflicts with a target calibration value;
determining, at a processor, that the updated component configuration is not acceptable based on the calibration conflict;
flagging the updated component configuration for review based on determining that the updated component configuration is not acceptable;
correlating issues with the updated component configuration with features present in a plurality of the fleet vehicles;
identifying an unacceptable change in the updated component configuration based in part on the correlation, wherein the unacceptable change includes a first change to the first component including one of the first updated extrinsic calibration value, the second updated extrinsic calibration value, and the third updated extrinsic calibration value;
identifying a level of immediacy of service to address the unacceptable change;
scheduling the first autonomous vehicle for service based on the unacceptable change and the level of immediacy;

routing the first autonomous vehicle to a service center;
receiving, from the first autonomous vehicle, image data from at least one of cameras on the first autonomous vehicle and cameras inside the first autonomous vehicle;
presenting data about the first component in the bill of materials to augmented reality glasses, and wherein presenting data includes presenting the component data and presenting a camera feed based on the at least one of cameras on the first autonomous vehicle and cameras inside the first autonomous vehicle;
receiving, from the augmented reality glasses, selection of 3-dimensional coordinates for a precise vehicle location, wherein the presenting data about the first component is based on the precise vehicle location.

2. The method of claim 1, further comprising creating a log of changes to the bill of materials.

3. The method of claim 1, wherein running the automatic component detection process comprises running the automatic component detection process when the vehicle is in service.

4. The method of claim 1, wherein determining that the updated component configuration is not acceptable includes comparing the updated component configuration to a target configuration, wherein the target configuration includes a range of target values.

5. The method of claim 1, further comprising presenting data from the bill of materials about selected components when the glasses are directed at the selected components.

6. The method of claim 1, further comprising reporting the updated component configuration in the bill of materials in a human-readable format, wherein reporting complies with selected compliance goals.

7. The method of claim 1, wherein the self-reported component data is first self-reported component data, and further comprising:
receiving a firmware update for a second component, wherein the second component updates component firmware of the second component,
receiving second self-reported component data from the second component, including receiving an update to second component firmware data, and
transmitting respective self-reported component data from respective components of the vehicle, wherein the respective components include the first component and the second component.

8. The method of claim 7, wherein transmitting self-reported component data includes transmitting the firmware update to second component firmware data to at least one of an onboard computer, a central computer, a cloud, and a web application, wherein the updated component data includes the second self-reported component data from the second component, and further comprising:
identifying a firmware version conflict including determining that the second component firmware conflicts with a target firmware value; and
determining, at a processor, that the updated component configuration is not acceptable based on the firmware version conflict.

9. The method of claim 5, further comprising identifying the presence of an unexpected sound related to the unacceptable change, and receiving auditory data of the unexpected sound recorded from vehicle microphones.

10. The vehicle of claim 1, wherein the augmented reality system is configured to display data about selected components when the glasses are directed at the selected components.

11. An autonomous vehicle having an automatically updated bill of materials, comprising:
a plurality of components, wherein the plurality of components each receive component updates including firmware updates,
wherein the plurality of components are each configured to self-report selected component data, including updated component firmware data,
wherein the plurality of components includes a first component,
wherein the first component receives a calibration and generates a first updated extrinsic calibration value for a first variable, a second updated extrinsic calibration value for a second variable, and a third updated extrinsic calibration value for a third variable, and
wherein the first component is one of a LIDAR component and a RADAR component;
a processor configured to:
determine that a calibration has occurred in the autonomous vehicle,
run an automatic component detection process for detecting data about the plurality of components, wherein the automatic component detection process is run in response to determining that the calibration had occurred,
receive first self-reported component data from the first component, including the first updated extrinsic calibration value, the second updated extrinsic calibration value, and the third updated extrinsic calibration value,
output an updated component configuration including updated component data for the plurality of components, wherein the updated component data includes the first self-reported component data,
compare changes to the updated component configuration with recorded acceptable configuration parameters,
identify a calibration conflict including determining that at least one of the first extrinsic calibration value, the second extrinsic calibration value, and the third extrinsic calibration value conflicts with a target calibration value,
determine that the respective self-reported component data do not meet predetermined criteria based on the calibration conflict
flag the unacceptable component data for review based on determining that the updated component configuration is not acceptable,
correlate issues with the unacceptable component data with features present in a plurality of fleet vehicles,
identify an unacceptable change in the updated component configuration based on the correlation, wherein the unacceptable change includes a first change to the first component including one of the first updated extrinsic calibration value, the second updated extrinsic calibration value, and the third updated extrinsic calibration value,
identify a level of immediacy of service to address the unacceptable change;
schedule the autonomous vehicle for service based on the unacceptable change and the level of immediacy, and route the autonomous vehicle to a service center;
a database for storing the respective self-reported component data for each of the plurality of components,
wherein the database is configured to update previously-stored data based on the self-reported component data; and
an augmented reality system
wherein the augmented reality system is configured to receive, from the autonomous vehicle, image data from at least one of cameras on the autonomous vehicle and cameras inside the autonomous vehicle,
wherein the augmented reality system is configured to receive a selection of 3-dimensional coordinates for a precise vehicle location, and
wherein data about the first component and the image data is presented to augmented reality glasses based on the selection.

12. The vehicle of claim 11, further comprising a second database for storing changes between an original bill of materials and updated stored data for each of the plurality of components.

13. The vehicle of claim 11, wherein each of the plurality of components is to transmit respective self-reported component data, including updated component firmware data.

14. A system for an autonomous vehicle having a self-updating bill of materials, comprising:
a fleet of autonomous vehicles, including a first autonomous vehicle;
a central computer in communication with the fleet of autonomous vehicles;
wherein the first autonomous vehicle comprises:
an onboard computer to receive component firmware updates; and
a plurality of components including a plurality of sensors from a sensor suite,
wherein the plurality of components are configured to update component firmware based on received component firmware updates from the onboard computer,
wherein at least one of the plurality of components updates component firmware,
wherein each of the plurality of components is configured to self-report selected component data by transmitting the selected component data
wherein the plurality of components includes a first component,
wherein the first component receives a calibration and generates a first updated extrinsic calibration value for a first variable, a second updated extrinsic calibration value for a second variable, and a third updated extrinsic calibration value for a third variable, and
wherein the first component is one of a LIDAR component and a RADAR component;
wherein the onboard computer is configured to:
determine that a calibration has occurred in the vehicle,
run an automatic component detection process for detecting data about the plurality of components, wherein the automatic component detection process is run in response to determining that the calibration had occurred,
receive updated component data, including receiving first self-reported component data from the first component, including the first updated extrinsic calibration value, the second updated extrinsic calibration value, and the third updated extrinsic calibration value,
output an updated component configuration including updated component data for the plurality of components, wherein the updated component data includes the first self-reported component data, save the updated component data to an updated bill of materials, compare changes to the updated component configuration with recorded acceptable configuration parameters, identify a calibration conflict including determining that at least one of the first extrinsic calibration value, the second extrinsic calibration value, and the third extrinsic calibration value conflicts with a target calibration value, determine that the updated component configuration is not acceptable based on the calibration conflict, flag the updated component configuration for review based on determining that the updated component configuration is not acceptable, identify an unacceptable change in the updated component configuration based in part on the correlation, wherein the unacceptable change includes a first change to the first component including one of the first updated extrinsic calibration value, the second updated extrinsic calibration value, and the third updated extrinsic calibration value transmit the updated component configuration to the central computer, identify a level of immediacy of service to address the unacceptable change, schedule the first autonomous vehicle for service, and route the first autonomous vehicle to a service center; and wherein the central computer is configured to:

correlate issues with the updated component configuration with features present in a plurality of vehicles in the fleet of autonomous vehicles, identify the unacceptable change in the updated component configuration based in part on the correlation; and an augmented reality system at the service center, wherein the augmented reality system is configured to receive, from the first autonomous vehicle, image data from at least one of cameras on the first autonomous vehicle and cameras inside the first autonomous vehicle, wherein the augmented reality system is configured to receive a selection of 3-dimensional coordinates for a precise vehicle location, and wherein data about the first component and the image data is presented to augmented reality glasses based on the selection.

15. The system of claim 14, wherein the onboard computer is further configured to store changes between an original bill of materials and the updated bill of materials.

\* \* \* \* \*